United States Patent [19]

Pender

[11] Patent Number: 5,331,328
[45] Date of Patent: Jul. 19, 1994

[54] METHOD OF PHASED MAGNITUDE CORRELATION USING BINARY SEQUENCES

[75] Inventor: Michael Pender, Lancaster, Calif.

[73] Assignee: The United States of America as represented by the Secretary of the Navy, Washington, D.C.

[21] Appl. No.: 153,864

[22] Filed: Nov. 15, 1993

Related U.S. Application Data

[63] Continuation-in-part of Ser. No. 23,440, Feb. 26, 1993, Pat. No. 5,283,586.

[51] Int. Cl.$^5$ ............................................. G01S 7/292
[52] U.S. Cl. .................................. 342/189; 342/378; 342/379; 342/145
[58] Field of Search .............. 342/189, 132, 134, 135, 342/145, 202, 203, 378, 379

[56] References Cited

U.S. PATENT DOCUMENTS

| | | | |
|---|---|---|---|
| H484 | 6/1988 | Holliday | 342/201 |
| 4,259,650 | 3/1981 | Donahue | 342/189 X |
| 4,353,067 | 10/1982 | Mims | 342/201 |
| 4,513,288 | 4/1985 | Weathers et al. | 342/201 |
| 4,566,010 | 1/1986 | Collins | 342/201 |
| 4,580,139 | 4/1986 | Weathers et al. | 342/189 |
| 4,584,579 | 4/1986 | Frost et al. | 342/189 |
| 4,698,827 | 10/1987 | Kretschmer | 342/201 X |
| 4,833,479 | 5/1989 | Carlson | 342/194 |
| 5,070,337 | 12/1991 | Chen et al. | 342/201 |
| 5,189,428 | 2/1993 | Bouvet et al. | 342/132 |

*Primary Examiner*—John B. Sotomayor
*Attorney, Agent, or Firm*—David S. Kalmbaugh; Melvin J. Sliwka; John L. Forrest, Jr.

[57] ABSTRACT

A method for allowing a correlation function to be applied to binary codes of length 3 to length 128. A user may specify the desired length of the binary codes for correlation processing; whether the binary code is to use a phase sidelobe level as the threshold or a sidelobe amplitude as the threshold. The user will also be asked to specify the threshold as well as an in phase coefficient referred to as alpha and an out of phase coefficient referred to as a beta. The user may also specify that the codes be expanded which results in correlated compounds having a length twice that of the specified length being displayed to the user. When the user has specified the parameters for correlation processing of the binary code length selected by the user, the program of the present invention will process the binary codes eliminating allomorphic and symmetrical forms of the codes from correlation and then display the results to the user.

9 Claims, 8 Drawing Sheets

METHOD OF PHASED MAGNITUDE CORRELATION USING BINARY SEQUENCES

This application is a continuation-in-part of U.S. patent application Ser. No. 08/023,440, filed Feb. 26, 1993 now U.S. Pat. No. 5,283,586.

BACKGROUND OF THE INVENTION

1. Field of the Invention

The present invention relates generally to pulse compression methods and, in particular, to a method which utilizes binary sequences for maximum sidelobe suppression in a pulse compression radar system or the like.

2. Description of the Prior Art

Pulse compression involves the transmission of a long coded pulse and the processing of the received echo to obtain a relatively narrow pulse. The increased detection capability of a long pulse radar system is achieved while retaining the range resolution capability of a narrow pulse system.

Several distinct advantages are obtained utilizing pulse compression radar systems. For example, transmission of long pulses permits a more efficient use of the average power capability of the radar system. The average power of the radar system may be increased without increasing the pulse repetition frequency and, hence, decreasing the radar system's unambiguous range. Further, pulse compression radar systems are less vulnerable to interfering signals that differ from the coded transmitted signal. The use of long pulses also provides an increased system resolving capability.

A problem that has limited the utility of pulse compression and correlation receivers in radar systems has been the existence of temporal/range sidelobes in the correlation function of the radar waveform. These sidelobes allow out-of range gate returns, such as clutter, to compete with a target in a particular range gate.

A number of research efforts have addressed this problem in the past and several waveform designs have resulted in the potential reduction or elimination of the range sidelobe problem.

For example, in pulse compression radar systems, the Barker code (also known as perfect binary words) is one of the most commonly used Binary phase coded waveforms, because it has a relatively high ratio between its mainlobe and sidelobes. However, the length of the Barker code is relatively short with the maximum length of the Barker code being thirteen binary bits for a minimum sidelobe peak of one.

Several properties of binary coded waveforms are desirable if they are to be used in implementing pulse compression in pulse compression radar and tracking systems such as the target sensor component of a missile or a fire control system. These properties include very low or zero temporal sidelobes in the correlation function and very low or zero cross-correlation with other binary codes that may be implemented in sensors deployed nearby. These properties would ensure that there would be little or no degradation in sensor system performance due to out of range gate clutter returns, multiple target sidelobes or from mutual interference between deployed sensors using different codes.

SUMMARY OF THE INVENTION

Accordingly it is a principal object of the present invention to provide a new method for using correlation techniques to substantially reduce or eliminate temporal/range sidelobes in the correlation function of a radar waveform.

It is another object of the present invention to provide an improved pulse compression technique wherein range sidelobe control is provided with no loss in resolution in the mainlobe.

It is yet another object of the present invention to provide a method whereby long binary codes of length up to 128 bits may be utilized in the correlation function to insure a relatively high ratio between the mainlobe and sidelobes of binary phase coded waveforms.

It is yet a further object of the present invention to provide a method whereby the optimum number of binary codes of length up to 128 bits may be selected for correlation in a relatively short time period.

In order to achieve the above mentioned and other objects of the present invention a method is implemented using a computer program which allows a correlation function to be applied to binary codes of length 3 to length 128. A user may specify the desired length of the binary codes for correlation processing; whether the binary code is to use a phase sidelobe level as the threshold or a sidelobe amplitude as the threshold. The user will also be asked to specify the threshold as well as an in phase coefficient referred to as alpha and an out of phase coefficient referred to as a beta. The user may also specify that the codes be expanded which results in correlated compounds having a length twice that of the specified length being displayed to the user. When the user has specified the parameters for correlation processing of the binary code length selected by the user, the program of the present invention will process the binary codes eliminating allomorphic and symmetrical forms of the codes from the correlation process and then display the results to the user.

DETAILED DESCRIPTION OF THE PREFERRED EMBODIMENT

Figure 1:
FIG. 1 illustrates a binary phase coded signal utilizing plus ones and minus ones as the phase code.

Phase-coded waveforms divide the pulse/carrier signal to be transmitted into a number of subpulses of equal duration with each subpulse having a particular phase. The phase of each subpulse is selected in accordance with a given code sequence. The most widely used phase-coded waveform employs two phases and is referred to as binary coding or biphase coding. Typically, the binary code consist of a sequence of either zeros and ones or plus ones and minus ones. The phase of the transmitted signal alternates between 0° and 180° in accordance with the sequence of elements, either zeros and ones, or plus ones and minus ones in the phase code as shown in FIG. 1. As is best illustrated by FIG. 1 the coded signal is generally discontinuous at the phase reversal points (transition from +1 to −1 or −1 to +1) since the transmitted frequency is not usually a multiple of the reciprocal of the subpulse width. Upon receiving the echo or return signal of the binary phase coded signal from a target, the compressed pulse may be obtained by well known techniques such as filtering or correlation processing.

Figure 2A:
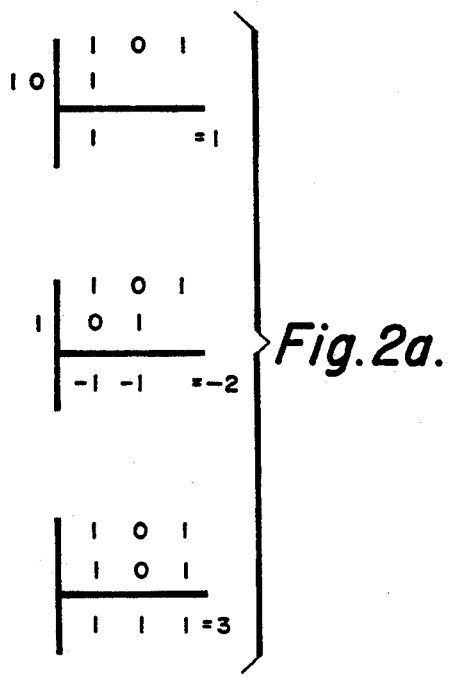
FIGS. 2a and 2b is an example illustrating the correlation function for a received binary phase-coded waveform of length three utilizing the method of the present invention wherein the sign is retained during correlation of the waveform.
Figure 2B:
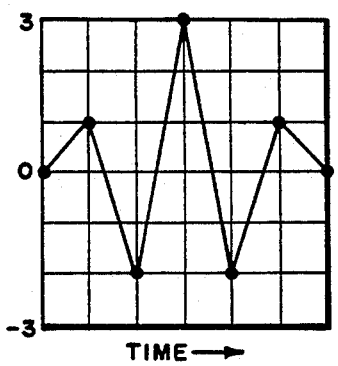

Binary codes whose autocorrelation function or zero doppler response exhibit the minimum possible sidelobes for a given code length of N are very desirable for binary sequences. FIGS. 2a and 2b illustrate a correlation function for a code length of 3 and a binary bit pattern of 1,0,1 which utilizes the following lookup table where in phase pairs are represented by weighting coefficient of one and out-of-phase pairs are represented by a weighting coefficient of minus one:

TABLE I

Binary code length = N $0 \times 0 = 1$   $1 \times 1 = 1$   $0 \times 1 = -1$   $1 \times 0 = -1$ In the correlation process illustrated in FIGS. 2(a) and 2(b) the computer software program set forth in Appendix A allows negative numbers to be considered when using the correlation method of the present invention to obtain the mainlobe and sidelobes of the received signal. For the three bit received signal of FIGS. 2(a) and 2(b), the first correlation with the transmitted signal will result in one; the second correlation will result in minus two and the third correlation will result in plus three. FIG. 2(b) shows the received signal wherein the sign of each correlation of the subpulses is retained in order to provide a significant gain in mainlobe to sidelobe ratio that leads to better discrimination of the target in pulse compression radar systems. The correlation technique illustrated by FIGS. 2a and 2b is in contrast to prior art correlation techniques wherein a target becomes indistinguishable from sidelobes for some binary sequences whenever the absolute value of the correlation function is used during processing of the received signal.

In binary phase-coded waveforms, it is desired to use the "optimal binary sequence" as the long coded pulse in a pulse compression radar system because of the ease with which such codes may be generated and the desirability of the corresponding correlation functions of echo or received. Such long coded pulses are useful in providing reduced range sidelobes in the echo or received signal as well as achieving range sidelobe control with little or no loss in resolution in the mainlobe.

While Barker codes are limited to a maximum code length of thirteen for a minimum peak sidelobe magnitude of one, the method of the present invention may be used to obtain code lengths greater than thirteen having a sidelobe whose magnitude is either zero (the desired "perfect range correlation property) or one which is well within acceptable limits for sidelobes wherein the code length is greater than thirteen.

A binary code may be represented in any one of four allomorphic forms with all four codes having the same correlation characteristics. These codes are the code itself, the inverted code (the coded written in reverse order), the complement of the code (ones are changed to zeros and zeros are changed to ones) and the inverted complemented code. For example, for the 7 bit Barker code 1110010; the inverted code is 0100111; the complement of the code is 0001101 and the inverted complemented code is 1011000. The software program of Appendix A utilizes these properties of binary coded waveforms when correlating binary sequences for a given code length N, eliminating codes from the correlation process which are "allomorphic forms" of another code within the binary sequence for the given code length N.

Binary codes of code length four, which is an even code length, are set forth in the following Table:

TABLE II

| Binary code length = 4 | | | |
|---|---|---|---|
| 0000 | 0100 | 1000 | 1100 |
| 0001 | 0101 | 1001 | 1101 |
| 0010 | 0110 | 1010 | 1110 |
| 0011 | 0111 | 1011 | 1111 |

The binary code 1111 has only one allomorphic form 0000 which is its complement. Binary code 1000 has three allomorphic forms, its inverted form 0001, its complement 0111 and its inverted complemented form 1110.

After the most significant bit of each four bit code is set to a logic one, the program of Appendix A examines the codes in numerical order beginning with 1000 to 1111 and eliminates identical codes (0000 through 0111), that is the program of Appendix A eliminates the inverted form of any binary code.

For even length codes the program of Appendix A next looks for even length doublets and mixed doublets. For an even length code sequence the program of Appendix A compares the bits on the left side of the code sequence with the bits on the right side of the code sequence. Whenever the bits on the left side are identical to the bits on the right side of the code sequence (1010, 1111) or whenever the compliment of the bits on the right side is identical to the bits on the left side of the code sequence (1001, 1100) the program of Appendix A looks for the next sequential even length doublet or mixed doublet, skipping the correlation process for all codes between a sequential doublet/mixed doublet. For the binary sequence of Table II, the program of Appendix A skips the correlation process for codes between 1100 and 1111 since 1100 is a mixed doublet and 1111 is a doublet. The program of Appendix A correlates only the codes 1000, 1001, 1010, 1011, 1100 and 1111 having eliminating the allomorphic forms of these codes. For example, for the binary code 1000, the program of Appendix A eliminates the code written in reverse order 0001, its compliment code 0111 and its inverted complemented code 1110. It should be noted that the code 1101 is the complement of the code 0010, while the code 1110 is the complement of the code 0001.

Binary codes of code length five, which is an even code length, are set forth in the following Table:

TABLE III

| Binary code length = 5 | | | |
|---|---|---|---|
| 00000 | 01000 | 10000 | 11000 |
| 00001 | 01001 | 10001 | 11001 |
| 00010 | 01010 | 10010 | 11010 |
| 00011 | 01011 | 10011 | 11011 |
| 00100 | 01100 | 10100 | 11100 |
| 00101 | 01101 | 10101 | 11101 |
| 00110 | 01110 | 10110 | 11110 |
| 00111 | 01111 | 10111 | 11111 |

After the most significant bit of each five bit code is set to a logic one, the program of Appendix A examines the codes in numerical order beginning with 10000 to 11111 and eliminates identical codes (00000 through 01111), that is the program of Appendix A eliminates the inverted form of any binary code.

For odd length codes the program of Appendix A next looks for odd length palindromes, that is the program upon finding a code such as 10001 sets the middle bit to a logic one and then skips to 10101 eliminating the codes 10010, 10011 and 10100 from correlation processing. The program of Appendix A then proceeds to the next sequential palindrome 11011, sets the middle bit to one and eliminates codes 11100, 11101 and 11110 from correlation processing.

The program of Appendix A correlates only the codes 10000, 10001, 10101, 10110, 10111, 11000, 11001, 11010, 11011 and 11111 having eliminated the allomorphic forms of these codes. For example, for the binary code 10000, the program of Appendix A eliminates the code written in reverse order 00001, its complement code 01111 and its inverted complemented code 11110. To illustrate a second example from Table II, for the binary code 10110, the program of Appendix A eliminates the code written in reverse order 01101, its complement code 01001 and its inverted complemented code 10010.

For odd length binary codes a binary sequence A, of length N is a palindrome if for $n=0$ to $(N-1)/2$, $A_n = A_{N-n-1}$. For even length binary codes a binary sequence A, of length N is a doublet if for $n=0$ to $(N/2)-1$, $A_n = A_{n+N/2}$. Similarly, for even length binary codes a binary sequence A, of length N is a mixed doublet if for $n=0$ to $(N/2)-1$, $A_n = \sim A_{n+N/2}$.

The method of the present invention, that is the computer software of Appendix A also makes use of the following Tables and their correlation processing rules (indicated in parenthesis) to further reduce the number of binary codes of a given length N which will be correlation processed.

TABLE IV

| | Binary code length = N | | |
|---|---|---|---|
| A A | $A_I A(1)$ | $A_C A$ | $A_{IC} A$ |
| A $A_I(1)$ | $A_I A_I$ | $A_C A_I$ | $A_{IC} A_I$ |
| A $A_C$ | $A_I A_C(1)$ | $A_C A_C$ | $A_{IC} A_C$ |
| A $A_{IC}(1)$ | $A_I A_{IC}$ | $A_C A_{IC}$ | $A_{IC} A_{IC}$ |

The program of Appendix A does not evaluate, that is the program of Appendix A does not correlate, the following compounds of Table IV: $A_C A$; $A_{IC} A$; $A_I A_I$; $A_C A_I$; $A_{IC} A_I$; $A_C A_C$; $A_{IC} A_C$; $A_I A_{IC}$; $A_C A_{IC}$ and $A_{IC} A_{IC}$ where $A_I$ is the inverse of the code A, $A_C$ is the complement of the code A and $A_{IC}$ is the inverse complement of the code A.

TABLE V

| | Binary code length = N | | |
|---|---|---|---|
| A B | $A_I B(1)$ | $A_C B$ | $A_{IC} B(1)$ |
| A $B_I(2)$ | $A_I B_I(3)$ | $A_C B_I(2)$ | $A_{IC} B_I(3)$ |
| A $B_C$ | $A_I B_C$ | $A_C B_C$ | $A_{IC} B_C$ |
| A $B_{IC}$ | $A_I B_{IC}$ | $A_C B_{IC}$ | $A_{IC} B_{IC}$ |

The program of Appendix A does not evaluate, that is the program of Appendix A does not correlate, the following compounds of Table V: A $B_C$; $A_I B_C$; $A_C B_C$; $A_{IC} B_C$ A $B_{IC}$; $A_I B_{IC}$; $A_C B_{IC}$ and $A_{IC} B_{IC}$ where $A_I$ is the inverse of the code A, $A_C$ is the complement of the code A, $A_{IC}$ is the inverse complement of the code A, $B_I$ is the inverse of the code B, $B_C$ is the complement of the code B, and $B_{IC}$ is the inverse complement of the code B.

The following rules apply (shown in parenthesis) when the program of Appendix A evaluates the compounds of TABLE IV and TABLE V for correlation:

(1) If A is a palindrome, doublet, or mixed doublet the compound (binary code) is not evaluated, that is the compound is not correlated.

(2) If B is symmetric, the compound (binary code) is not evaluated, that is the compound is not correlated.

(3) If A is a palindrome, doublet, or mixed doublet, or if B is symmetric, the compound is not evaluated, that is the compound is not correlated.

With respect to Rule (2), symmetry for an even length bit pattern of length 2A may be defined as A and its inverse $A_I$, while an odd length bit pattern is symmetrical about its center bit. For example, the bit pattern 101 is symmetrical about zero, while the bit pattern 1001 is symmetrical since A which is 10 is equivalent to $A_I$ which is 01.

The following example illustrates the operation of the program of Appendix A with respect to the evaluation of compounds of length $N=6$ for correlation in accordance the procedures set forth in TABLE IV and TABLE V.

After the allomorphic forms of the codes of length three are eliminated by the program of Appendix A, the following codes of length are processed by the program of appendix A according to the rules of TABLES IV and V: 111, 101, 100. The program of Appendix A will first evaluate A A (111111) using TABLE IV; next evaluate A B (111101) using TABLE V; then evaluate A B (111100) using TABLE V; evaluate A A (101101) using TABLE IV; evaluate A B (101100) using TABLE V and lastly evaluate A A (100100) using TABLE IV.

A which is the prefix and suffix of the compound is first set to 111 and then evaluated in the following manner.

| | Prefix | Suffix | |
|---|---|---|---|
| A = 111 | | | |
| A A | 111 | 111 | |
| A $A_I$ | 111 | 111 | Not evaluated rule 1 |
| A $A_C$ | 111 | 000 | |
| A $A_{IC}$ | 111 | 000 | Not evaluated rule 1 |
| $A_I$ A | 111 | 111 | Not evaluated rule 1 |
| $A_I A_C$ | 111 | 000 | Not evaluated rule 1 |
| A = 111, B = 101 | | | |
| A B | 111 | 101 | |
| A $B_I$ | 111 | 101 | Not evaluated rule 2 |
| $A_I$ B | 111 | 101 | Not evaluated rule 1 |
| $A_I B_I$ | 111 | 101 | Not evaluated rule 3 |
| $A_C$ B | 000 | 101 | |
| $A_C B_I$ | 000 | 101 | Not evaluated rule 2 |
| $A_{IC}$ B | 000 | 101 | Not evaluated rule 1 |
| $A_{IC} B_I$ | 000 | 101 | Not evaluated rule 3 |
| A = 111, B = 100 | | | |
| A B | 111 | 100 | |
| A $B_I$ | 111 | 001 | |
| $A_I$ B | 111 | 100 | Not evaluated rule 1 |
| $A_I B_I$ | 111 | 001 | Not evaluated rule 3 |
| $A_C$ B | 000 | 100 | |
| $A_C B_I$ | 000 | 001 | |
| $A_{IC}$ B | 000 | 100 | Not evaluated rule 1 |
| $A_{IC} B_I$ | 000 | 001 | Not evaluated rule 3 |
| A = 101 | | | |
| A A | 101 | 101 | |
| A $A_I$ | 101 | 101 | Not evaluated rule 1 |
| A $A_C$ | 101 | 010 | |
| A $A_{IC}$ | 101 | 010 | Not evaluated rule 1 |
| $A_I$ A | 101 | 101 | Not evaluated rule 1 |
| $A_I A_C$ | 101 | 010 | Not evaluated rule 1 |
| A = 101, B = 100 | | | |
| A B | 101 | 100 | |
| A $B_I$ | 101 | 001 | |
| $A_I$ B | 101 | 100 | Not evaluated rule 1 |
| $A_I B_I$ | 101 | 001 | Not evaluated rule 3 |
| $A_C$ B | 010 | 100 | |

| | Prefix | Suffix | |
|---|---|---|---|
| $A_C B_I$ | 010 | 001 | |
| $A_{IC} B$ | 010 | 100 | Not evaluated rule 1 |
| $A_{IC} B_I$ | 010 | 001 | Not evaluated rule 3 |
| A = 100 | | | |
| A A | 100 | 100 | |
| A $A_I$ | 100 | 001 | |
| A $A_C$ | 100 | 110 | |
| A $A_{IC}$ | 100 | 011 | |
| $A_I$ A | 001 | 100 | |
| $A_I A_C$ | 001 | 011 | |

Referring now to FIGS. 3a–3h, there is shown a flow chart for the computer software program of Appendix A which constitutes the preferred embodiment of the present invention. Program step 13 initializes counters, while program steps 15 and 17 respectively require the user of the computer software program of Appendix A to provide the out of phase and in phase modifiers, that is the value for Alpha and the value of Beta for the code of length N under evaluation. Program step 19 requires the user to provide the code length of the element with the program of Appendix A being able to process code compounds of length of between 3 and 128. Program step 21 requires the user to specify whether the phased sidelobe level will be used as the threshold, that is, during the correlation process the program of Appendix A considers the sign of each correlation as is best illustrated by FIG. 2(b). If the answer to program step 21 is "yes" the user is next asked to specify phased sidelobe threshold, that is the maximum value of a sidelobe which the user considers acceptable during the correlation process.

Program step 23 requires the user to specify whether sidelobe amplitude level will be used as the threshold, that is, during the correlation process the program of Appendix A considers only the absolute value of each correlation. If the answer to program step 23 is "yes", the user is next asked to specify the sidelobe amplitude threshold, that is the maximum value of a sidelobe which the user considers acceptable during the correlation process. Program steps 25–31 ask the user whether all codes which meet the criteria for correlation processing are to be displayed for viewing on a monitor by the user. Program step 33 asks the user of the software whether the codes should be expanded, that is should the display illustrate sidelobes.

The following example illustrates the questions the user observes on a monitor and then answers (program steps 13–33) to correlate all binary codes for a code length of 3 and an expanded code of length 6.

This program computes pulse compression codes for use with a modified correlation sequence of arbitrary coefficients (Alpha, Beta)

Alpha? −1
Beta? 1
Generate codes of what length? (<128) 3
Use phased sidelobe level as threshhold? (Y/N) Y
Phased sidelobe threshhold? 2
Restrict selection by sidelobe amplitude level? (Y/N) N
Show all evaluated codes? (Y/N) N
Show usable codes? (Y/N) Y
Expand codes? (Y/N) Y

| 001 | −1 | 0 | 3 | [0] | [1] |
|---|---|---|---|---|---|
| 101 | 1 | −2 | 3 | [1] | [2] |
| 111 | 1 | 2 | 3 | [2] | [2] |
| 0 --> 1 | 1 --> 1 | | 2 --> 1 | | |

3 candidates for length 3. 3 judged acceptable.
Creating compounds . . .

| 111101 | 1 | 0 | 1 | 2 | 1 | 6 | [2] | [2] |
|---|---|---|---|---|---|---|---|---|
| 000101 | −1 | 0 | −1 | 2 | −1 | 6 | [2] | [2] |
| 000100 | 1 | 2 | 1 | 0 | 1 | 6 | [2] | [2] |
| 111001 | 1 | 0 | −1 | −2 | 1 | 6 | [1] | [2] |
| 101100 | −1 | 0 | 1 | −2 | −1 | 6 | [1] | [2] |
| 010100 | 1 | 0 | −1 | 2 | −3 | 6 | [2] | [3] |
| 101001 | 1 | −2 | 1 | 0 | −3 | 6 | [1] | [3] |
| 010001 | −1 | 2 | −1 | 0 | −1 | 6 | [2] | [2] |
| 100011 | 1 | 0 | −3 | −2 | 1 | 6 | [1] | [3] |
| 100001 | 1 | −2 | −1 | 0 | 1 | 6 | [1] | [2] |
| 100110 | −1 | 2 | 1 | −4 | −1 | 6 | [2] | [4] |
| 001100 | 1 | 2 | −1 | −4 | 1 | 6 | [2] | [4] |
| 001011 | −1 | −2 | 1 | 0 | −1 | 6 | [1] | [2] |

20 candidates for length 6. 13 judged acceptable.
Program Ends

The following example illustrates the questions the user observes on a monitor and then answers (program steps 13–33) to correlate all binary codes for a code length of 4 and an expanded code length of 8.

This program computes pulse compression codes for use with a modified correlation sequence of arbitrary coefficients (Alpha Beta)

Alpha? −1
Beta? 1
Generate codes of what length? (<128) 4
Use phased sidelobe level as threshhold? (Y/N) Y
Phased sidelobe threshhold? 3
Restrict selection by sidelobe amplitude level? (Y/N) N
Show all evaluated codes? (Y/N) N
Show usable codes? (Y/N) Y
Expand codes? (Y/N) Y

| 0001 | −1 | 0 | 1 | 4 | [1] | [1] |
|---|---|---|---|---|---|---|
| 1001 | 1 | −2 | −1 | 4 | [1] | [2] |
| 0101 | −1 | 2 | −3 | 4 | [2] | [3] |
| 1101 | 1 | 0 | −1 | 4 | [1] | [1] |
| 0011 | −1 | −2 | 1 | 4 | [1] | [2] |
| 1111 | 1 | 2 | 3 | 4 | [3] | [3] |
| 0 --> 0 | 1 --> 4 | 2 --> 1 | 3 --> 1 | | | |

6 candidates for length 4. 6 judged acceptable.
Creating compounds . . .

| 00001100 | 1 | 2 | 1 | 0 | −1 | −2 | 3 | 8 | [3] | [3] |
|---|---|---|---|---|---|---|---|---|---|---|
| 11110011 | 1 | 2 | 1 | 0 | −1 | −2 | 3 | 8 | [3] | [3] |
| 11111011 | 1 | 2 | 1 | 2 | 3 | 2 | 3 | 8 | [3] | [3] |
| 00001011 | −1 | −2 | −1 | −2 | 1 | 2 | 1 | 8 | [2] | [2] |
| 00001101 | −1 | 0 | −1 | −2 | 1 | 0 | 1 | 8 | [1] | [2] |
| 11111001 | 1 | 0 | −1 | 0 | 1 | 0 | 3 | 8 | [3] | [3] |
| 00001001 | −1 | 0 | 1 | 0 | 3 | 0 | 1 | 8 | [3] | [3] |
| 00001000 | 1 | 2 | 3 | 2 | 1 | 2 | 3 | 8 | [3] | [3] |
| 11110001 | 1 | 0 | −1 | −2 | −3 | 0 | 3 | 8 | [3] | [3] |
| 11000011 | 1 | 2 | −1 | −4 | −3 | −2 | 3 | 8 | [3] | [4] |
| 11001011 | 1 | 2 | −1 | −2 | 1 | −2 | −1 | 8 | [2] | [2] |
| 00111011 | −1 | −2 | 1 | 2 | −1 | −2 | 1 | 8 | [2] | [2] |
| 11001101 | 1 | 0 | −1 | 2 | 1 | −4 | −1 | 8 | [2] | [4] |
| 00111101 | −1 | 0 | 1 | −2 | −1 | 0 | 1 | 8 | [1] | [2] |
| 11001010 | −1 | 0 | 1 | 0 | −1 | 0 | −3 | 8 | [1] | [3] |
| 00111010 | 1 | 0 | −1 | 0 | −3 | 0 | −1 | 8 | [1] | [3] |
| 11000101 | 1 | 0 | −1 | 0 | −3 | 0 | −1 | 8 | [1] | [3] |

-continued

| | | | | | | | | | | |
|---|---|---|---|---|---|---|---|---|---|---|
| 00110101 | −1 | 0 | 1 | 0 | −1 | 0 | −3 | 8 | [1] | [3] |
| 11001001 | 1 | 0 | −3 | 0 | 3 | −4 | −1 | 8 | [3] | [4] |
| 00111001 | −1 | 0 | 3 | 0 | −3 | −4 | 1 | 8 | [3] | [4] |
| 11001000 | −1 | −2 | −1 | 2 | 1 | −2 | 1 | 8 | [2] | [2] |
| 00111000 | 1 | 2 | 1 | −2 | −5 | −2 | 3 | 8 | [3] | [5] |
| 11000001 | 1 | 0 | −3 | −2 | −1 | 0 | 3 | 8 | [3] | [3] |
| 00110001 | −1 | 0 | 3 | 2 | −3 | −4 | 1 | 8 | [3] | [4] |
| 10110100 | −1 | 0 | 1 | −4 | 3 | 0 | −3 | 8 | [3] | [4] |
| 10111101 | 1 | −2 | 3 | 0 | 1 | 2 | −1 | 8 | [3] | [3] |
| 10110010 | −1 | 2 | −3 | 0 | 3 | −2 | −3 | 8 | [3] | [3] |
| 11010100 | −1 | −2 | 1 | 0 | −1 | 2 | −3 | 8 | [2] | [3] |
| 10111010 | −1 | 2 | −3 | 2 | −1 | 2 | −3 | 8 | [2] | [3] |
| 01001010 | 1 | −2 | 3 | −2 | 1 | 2 | −5 | 8 | [3] | [5] |
| 11011010 | −1 | 0 | 1 | −2 | 3 | 0 | −3 | 8 | [3] | [3] |
| 10110101 | 1 | −2 | 3 | −2 | 1 | 2 | −5 | 8 | [3] | [5] |
| 01000101 | −1 | 2 | −3 | 2 | −1 | 2 | −3 | 8 | [2] | [3] |
| 00100101 | −1 | 0 | 1 | −2 | 3 | 0 | −3 | 8 | [3] | [3] |
| 10111001 | 1 | −2 | 1 | 2 | −1 | −2 | −1 | 8 | [2] | [2] |
| 11011001 | 1 | 0 | −3 | 2 | 3 | −4 | −1 | 8 | [3] | [4] |
| 00101001 | −1 | 0 | 3 | −2 | 1 | 0 | −3 | 8 | [3] | [3] |
| 10111000 | −1 | 0 | −1 | 0 | −3 | 0 | 1 | 8 | [1] | [3] |
| 01001000 | 1 | 0 | 1 | 0 | 3 | 0 | −1 | 8 | [3] | [3] |
| 11011000 | −1 | −2 | −1 | 0 | 1 | −2 | 1 | 8 | [1] | [2] |
| 00101000 | 1 | 2 | 1 | 0 | −1 | 2 | −1 | 8 | [2] | [2] |
| 10110001 | 1 | −2 | 1 | 0 | −1 | −2 | −1 | 8 | [1] | [2] |
| 01000001 | −1 | 2 | −1 | 0 | 1 | 2 | 1 | 8 | [2] | [2] |
| 11010001 | 1 | 0 | −3 | 0 | −1 | 0 | −1 | 8 | [1] | [3] |
| 00100001 | −1 | 0 | 3 | 0 | 1 | 0 | 1 | 8 | [3] | [3] |
| 10100101 | 1 | −2 | 3 | −4 | 1 | 2 | −5 | 8 | [3] | [5] |
| 10101001 | 1 | −2 | 1 | 0 | −1 | 2 | −5 | 8 | [2] | [5] |
| 01011001 | −1 | 2 | −1 | 0 | 1 | −2 | −3 | 8 | [2] | [3] |
| 01011000 | 1 | 0 | 1 | −2 | −1 | 0 | −1 | 8 | [1] | [2] |
| 10100001 | 1 | −2 | 1 | −2 | −1 | 2 | −1 | 8 | [2] | [2] |
| 01010001 | −1 | 2 | −1 | 2 | −3 | 2 | −3 | 8 | [2] | [3] |
| 10010110 | −1 | 2 | 1 | −4 | 3 | −2 | −3 | 8 | [3] | [4] |
| 10011000 | −1 | 0 | 1 | 2 | −1 | −4 | 1 | 8 | [2] | [4] |
| 01101000 | 1 | 0 | −1 | −2 | 1 | 0 | −1 | 8 | [1] | [2] |
| 10010001 | 1 | −2 | −1 | 2 | 1 | −2 | −1 | 8 | [2] | [2] |
| 01100001 | −1 | 2 | 1 | −2 | −1 | −2 | 1 | 8 | [2] | [2] |
| 10000111 | 1 | 0 | −1 | −4 | −3 | 0 | 3 | 8 | [3] | [4] |
| 10000001 | 1 | −2 | −1 | 0 | 1 | 2 | 3 | 8 | [3] | [3] |
| 10001110 | −1 | 2 | 1 | 0 | −5 | −2 | 1 | 8 | [2] | [5] |
| 00011000 | 1 | 2 | 3 | 0 | −3 | −2 | 3 | 8 | [3] | [3] |
| 00010111 | −1 | −2 | −3 | 0 | −1 | 2 | 1 | 8 | [2] | [3] |

82 candidates for length 8. 61 judged acceptable.
Program Ends

During program step 35, the software of Appendix A sets the Most Significant Bit of each code to a logic one. This allows each binary code which has as its Most Significant Bit a logic zero to be eliminated from the correlation process of program steps illustrated in the flow chart of FIG. 3d.

Figure 3H:
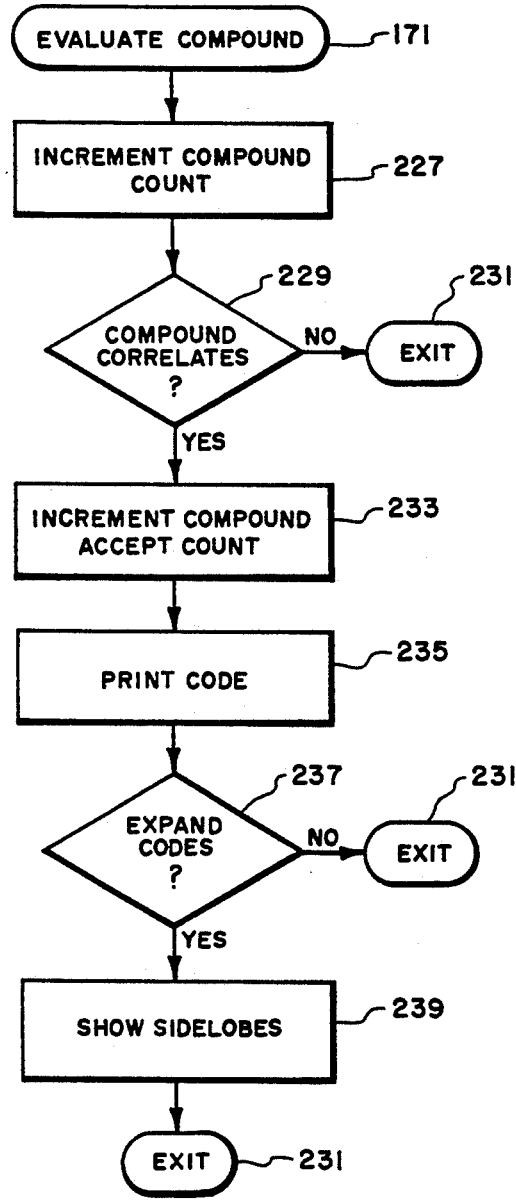
FIGS. 3a, 3b, 3c, 3d, 3e, 3f, 3g and 3h illustrate a flow chart for the computer software program of Appendix A which constitutes the preferred embodiment of the present invention.
Figure 3A:
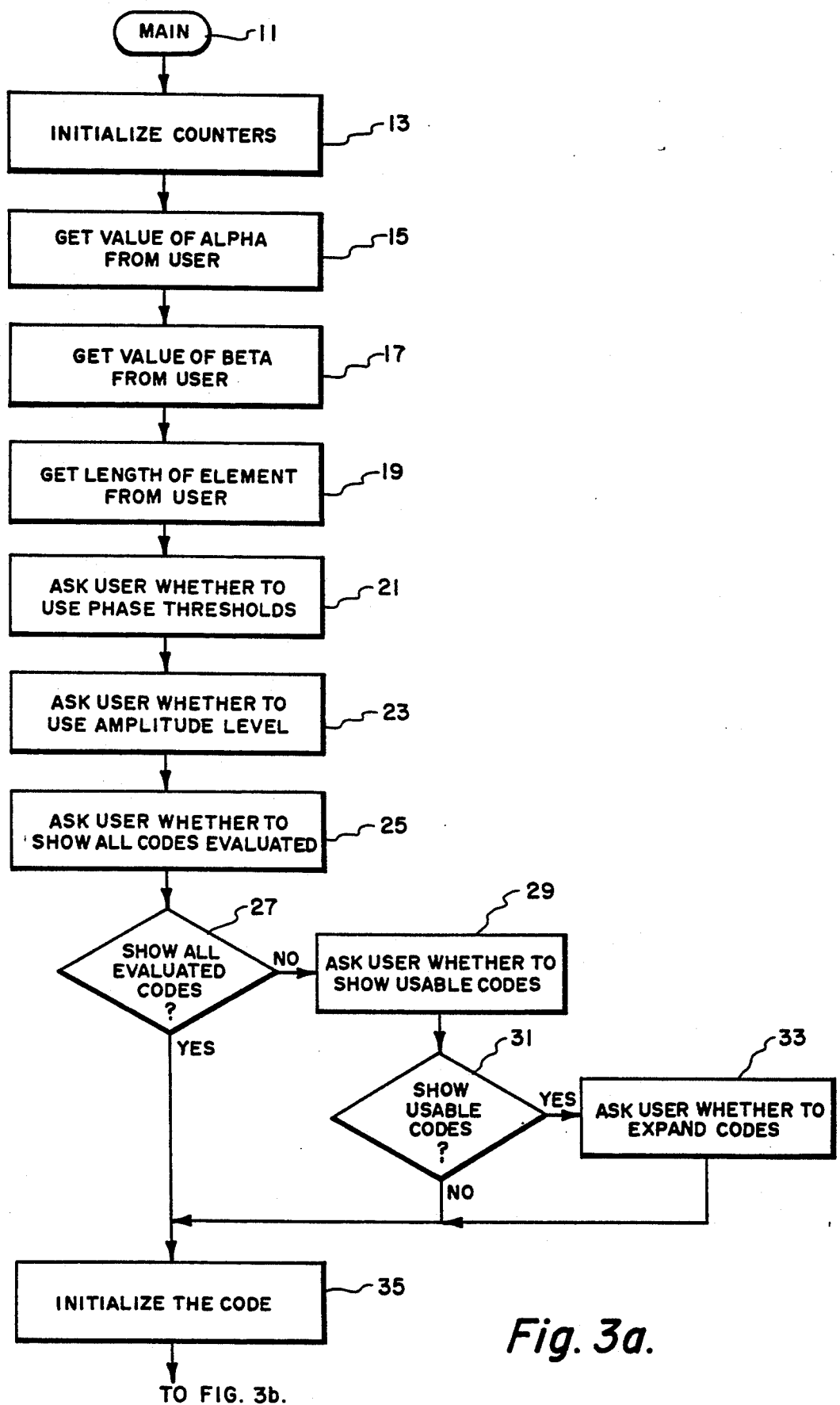
Figure 3B:
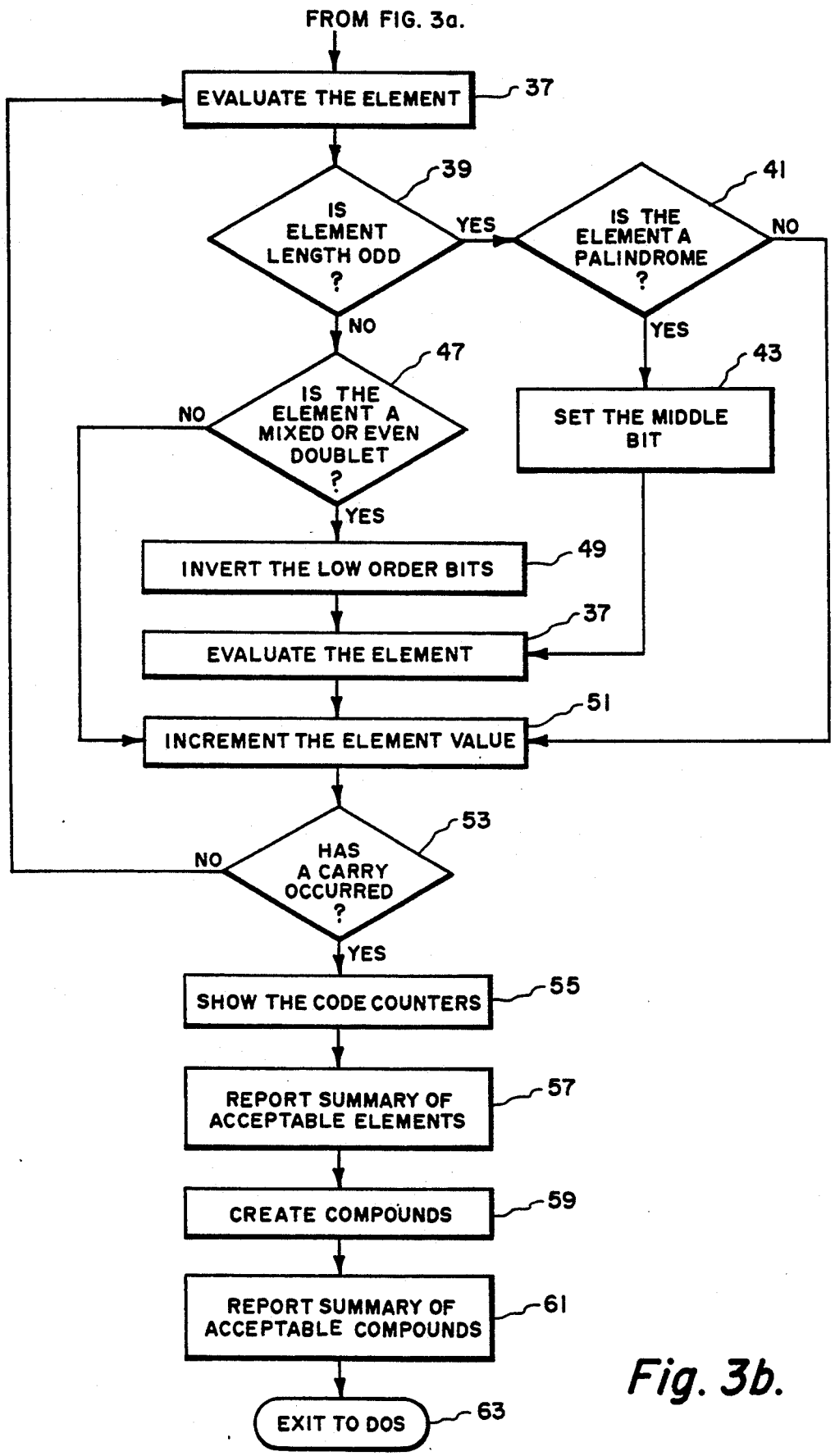
Figure 3C:
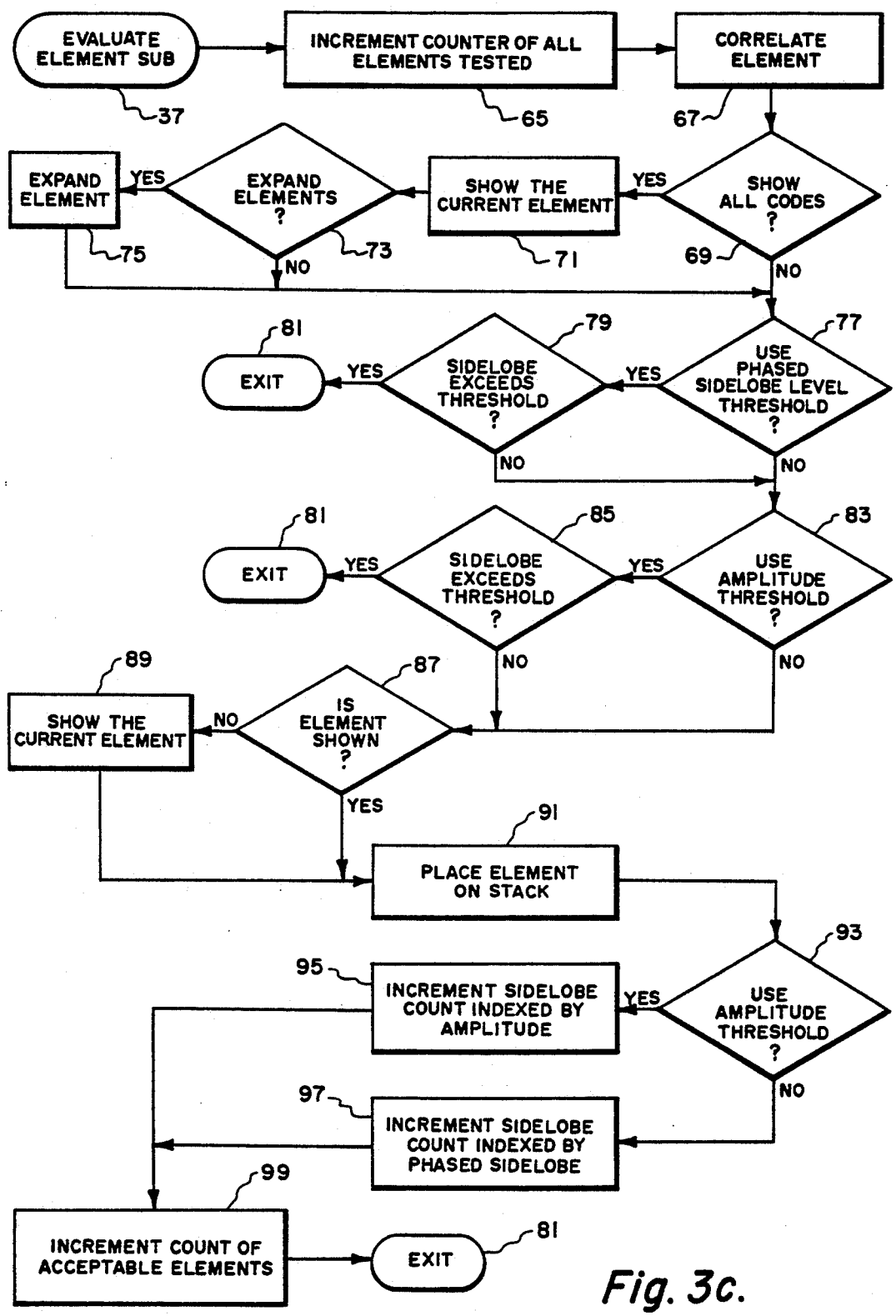

Referring now to FIG. 3b and 3c, the software of Appendix A evaluates/correlates the first binary code in sequence. The correlation process, which is illustrated by the flowchart of FIG. 3d (program steps 67–139), first correlates the binary code 100 for code length three, then correlates the binary code 101 followed by correlation of the binary code 111 for code length three.

Figure 3D:
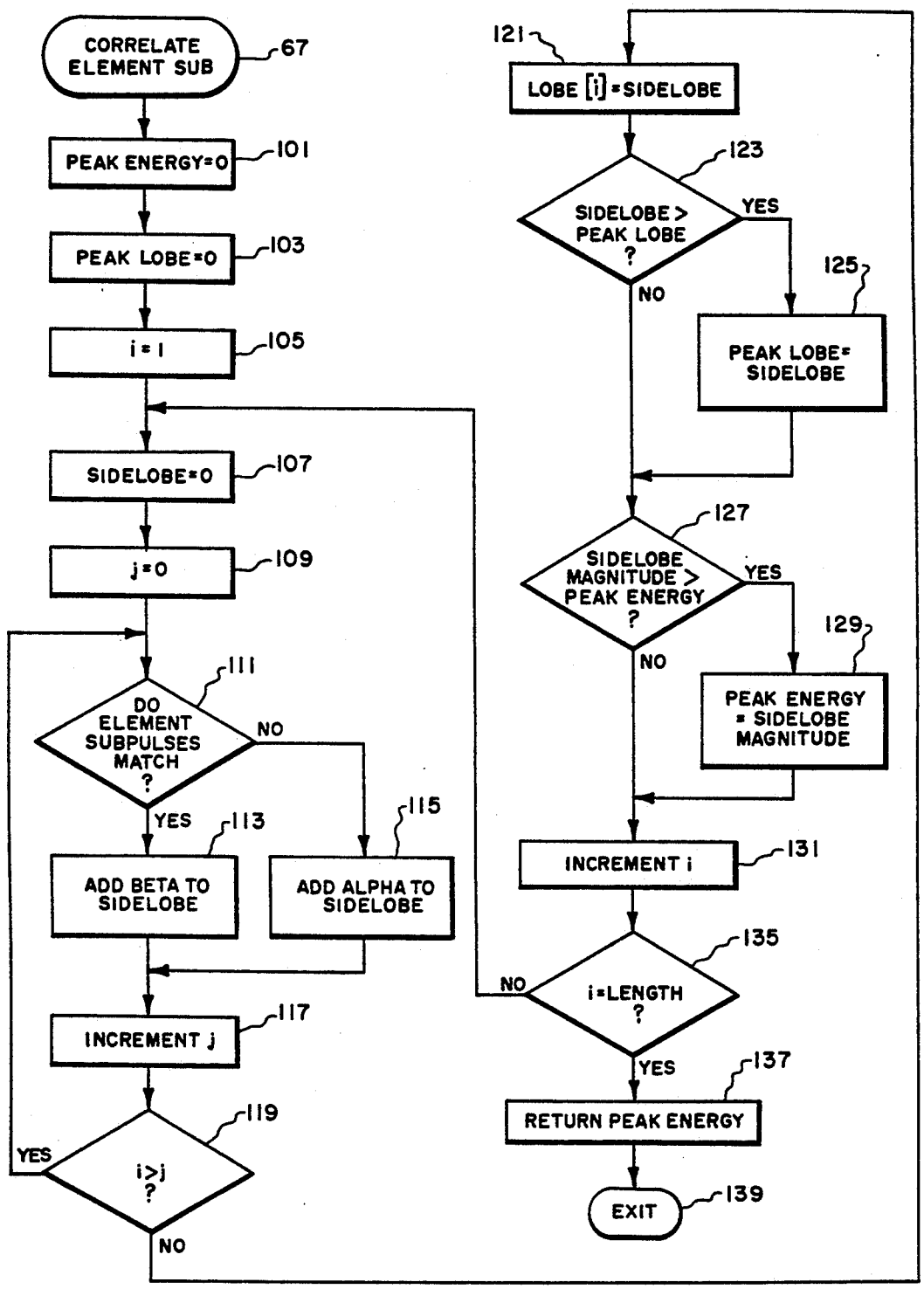

For example, when the user requests an evaluation of codes of length three (illustrated by FIG. 2) the code 101 is one of the codes processed by the correlation process of FIG. 3d. Specifically, program step 111 compares the code element subpulses and when the code element subpulses match, that is the codes are in phase, the in phase element Beta is added to the sidelobe (program step 113). In a like manner, when the code element subpulses do not match, the out of phase element Alpha is added to the sidelobe (program step 115). The correlation subroutine continues this process until "i" equals the element length (program step 135) which is the absolute value of the peak magnitude of the mainlobe. The program of Appendix A then exits the correlation subroutine (program step 139) for the particular binary code under evaluation proceeding to program step 69. For the code 101 the correlation process will provide the waveform illustrated in FIG. 2(b) when alpha is −1 and beta is 1.

Upon completing of the element evaluation subroutine of FIG. 3c the program of Appendix A returns (program step 81) to program step 53 and then ask whether the last code element for codes of the specified length has been evaluated, that is has a carry bit occurred. For example, when the code is of length four a carry bit will occur at 10000. The program of Appendix A then proceeds to program step 55. If, however, the answer is "no" the program of Appendix A evaluates the next sequential binary code element.

The software of Appendix A also eliminates allomorphic forms of a particular element from correlation processing beginning at program step 39. Program step 39 ask whether the code is an odd length element. If the answer is yes, that is the binary element under evaluation is an odd length element, then the program proceeds to program step 41.

Program step 41 ask whether the element being evaluated is a palindrome. If the answer is "no" the program proceeds to program step 51. If the answer is "yes" than the program proceeds to program step 43 setting the middle bit of the code to a logic one. For example, referring to Table III, the program of Appendix A will set the middle bit of the binary code 10001 to a logic one allowing the program of Appendix A to skip the correlation process for codes between 10001 and 10101. In a like manner, the program of Appendix A will set the middle bit of the binary 11011 to a logic one allowing the program to skip the correlation process for codes between 11011 and 11111. The program next proceeds to the evaluation subroutine of program step 37.

If the binary element under evaluation is an even length element such as the codes in Table II, the program of Appendix A proceeds to program step 47. Program step 47 asks whether the element under evaluation is an even doublet or mixed doublet. If the answer is "no" then the program proceeds to program step 51. If the answer is yes then the program of Appendix A inverts the low order bits (program step 49). For example, referring to Table II, the program of Appendix A will set the low order bits (two least significant bits) of the binary code 1100 (mixed doublet) to logic ones allowing the program of Appendix A to skip the correlation process for codes between 1100 and 1111 (doublet). The program next proceeds to the evaluation subroutine of program step 37.

Referring again to FIG. 3c, during program step 65 an internal program counter is incremented for all binary codes previously correlated by the program of Appendix A. Thus, for example, when the last binary code correlated is 100, the counter is incremented to 101 which is the next sequential code of length three for correlation. Further, when the last binary code of length three correlated is 101, the counter is incremented to 111 which is the next sequential binary code for correlation.

The program of Appendix A next proceeds to the correlation subroutine (program step 47) for the binary code under evaluation. The correlation process then correlates the binary code under evaluation. For example, the code 101 of length three illustrated by FIG. 2 is processed by the correlation process of steps 101–139.

The program of Appendix A then exits the correlation subroutine for the particular binary code under evaluation proceeding to program step 69.

Referring to FIG. 3c, when the user request that all binary codes being evaluated for correlation by the program of Appendix A be shown on a monitor, the program proceeds to program step 71. This step allows the user to view the element on the monitor irregardless of the elements acceptability to the user.

If the elements are expanded (program steps 73 and 75), the computer software of Appendix A proceeds to program steps 77 and 79 which for the binary code being evaluated determines whether the phase sidelobe level is being used as the threshold. For example, the user will observe the following on the monitor when the user uses the program of Appendix A to evaluate binary codes of length 3 and specifies that the phased sidelobe threshold be set at 2.

This program computes pulse compression codes for use with a modified correlation sequence of arbitrary coefficients (Alpha, Beta)
Alpha? −1
Beta? 1
Generate codes of what length? (<128) 3
Use phased sidelobe level as threshhold? (Y/N) Y
Phased sidelobe threshhold? 2
Restrict selection by sidelobe amplitude level? (Y/N) N
Show all evaluated codes? (Y/N) N
Show usable codes? (Y/N) Y
Expand codes? (Y/N) Y

| 001 | −1 | 0  | 3 | [0] | [1] |
|-----|----|----|---|-----|-----|
| 101 | 1  | −2 | 3 | [1] | [2] |
| 111 | 1  | 2  | 3 | [2] | [2] |
| 0 --> 1 | | 1 --> 1 | | 2 --> 1 | |

3 candidates for length 3. 3 judged acceptable.
Creating compounds . . .

| 111101 | 1  | 0  | 1  | 2  | 1  | 6 | [2] | [2] |
|--------|----|----|----|----|----|---|-----|-----|
| 000101 | −1 | 0  | −1 | 2  | −1 | 6 | [2] | [2] |
| 000100 | 1  | 2  | 1  | 0  | 1  | 6 | [2] | [2] |
| 111001 | 1  | 0  | −1 | −2 | 1  | 6 | [1] | [2] |
| 101100 | −1 | 0  | 1  | −2 | −1 | 6 | [1] | [2] |
| 010100 | 1  | 0  | −1 | 2  | −3 | 6 | [2] | [3] |
| 101001 | 1  | −2 | 1  | 0  | −3 | 6 | [1] | [3] |
| 010001 | −1 | 2  | −1 | 0  | −1 | 6 | [2] | [2] |
| 100011 | 1  | 0  | −3 | −2 | 1  | 6 | [1] | [3] |
| 100001 | 1  | −2 | −1 | 0  | 1  | 6 | [1] | [2] |
| 100110 | −1 | 2  | 1  | −4 | −1 | 6 | [2] | [4] |
| 001100 | 1  | 2  | −1 | −4 | 1  | 6 | [2] | [4] |
| 001011 | −1 | −2 | 1  | 0  | −1 | 6 | [1] | [2] |

20 candidates for length 6. 13 judged acceptable.
Program Ends

If the phase sidelobe level is not being used to process the codes under evaluation (program step 77) or if the sidelobe for the binary code being evaluated does not exceed the threshold set by the user than the program of Appendix A proceeds to program step 83. When the user answers the question "yes" with respect to program step 83, the following will appear on the monitor:

This program computes pulse compression codes for use with a modified correlation sequence of arbitrary coefficients (Alpha, Beta)
Alpha? −1
Beta? 1
Generate codes of what length? (<128) 3
Use phased sidelobe level as threshhold? (Y/N) N
Restrict selection by sidelobe amplitude level? (Y/N) Y
Sidelobe amplitude threshhold? 2
Show all evaluated codes? (Y/N) N
Show usable codes? (Y/N) Y
Expand codes? (Y/N) Y

| 001 | −1 | 0  | 3 | [0] | [1] |
|-----|----|----|---|-----|-----|
| 101 | 1  | −2 | 3 | [1] | [2] |
| 111 | 1  | 2  | 3 | [2] | [2] |
| 0 --> 0 | | 1 --> 1 | | 2 --> 2 | |

3 candidates for length 3. 3 judged acceptable.
Creating compounds . . .

| 111101 | 1  | 0  | 1  | 2  | 1  | 6 | [2] | [2] |
|--------|----|----|----|----|----|---|-----|-----|
| 000101 | −1 | 0  | −1 | 2  | −1 | 6 | [2] | [2] |
| 000100 | 1  | 2  | 1  | 0  | 1  | 6 | [2] | [2] |
| 111001 | 1  | 0  | −1 | −2 | 1  | 6 | [1] | [2] |
| 101100 | −1 | 0  | 1  | −2 | −1 | 6 | [1] | [2] |
| 010001 | −1 | 2  | −1 | 0  | −1 | 6 | [2] | [2] |
| 100001 | 1  | −2 | −1 | 0  | 1  | 6 | [1] | [2] |
| 001011 | −1 | −2 | 1  | 0  | −1 | 6 | [1] | [2] |

20 candidates for length 6. 8 judged acceptable.
Program Ends

It should be noted that whenever the sidelobe of a binary code under evaluation exceeds the phased sidelobe level threshold specified by the user (program step 79) or the sidelobe amplitude threshold specified by the user (program step 81), the program exits the evaluation subroutine via program step 81.

The program next proceeds to program steps 87 and 89 which provides that the only binary codes which will be shown to the user are those codes which meet, for example, the phased sidelobe threshold specified by the user in program step 21.

The program of Appendix A proceeds to program step 93, determines whether the amplitude threshold is being used for correlation (program step 69). If the answer is "no" the program increments the count of binary codes indexed/correlated by the phased sidelobe level specified by the user as the threshold. If the answer is "yes" the program increments the count of binary codes indexed/correlated by the sidelobe amplitude threshold specified by the user. Program step 99 then increments the count of binary codes which meet the phase sidelobe level or sidelobe amplitude thresholds specified by the user.

Upon completing the evaluation subroutine of program step 25 the program of Appendix A returns (program step 81) to program step 53, ask whether the last code has been evaluated and if the answer is "no" evaluates the next sequential binary code. If, however, the answer is "yes" then the program of Appendix A reports a summary of acceptable elements (program step 57) and then proceeds to create compounds of the elements in the manner set forth in TABLES IV and V (program steps 143-255).

Figure 3E:
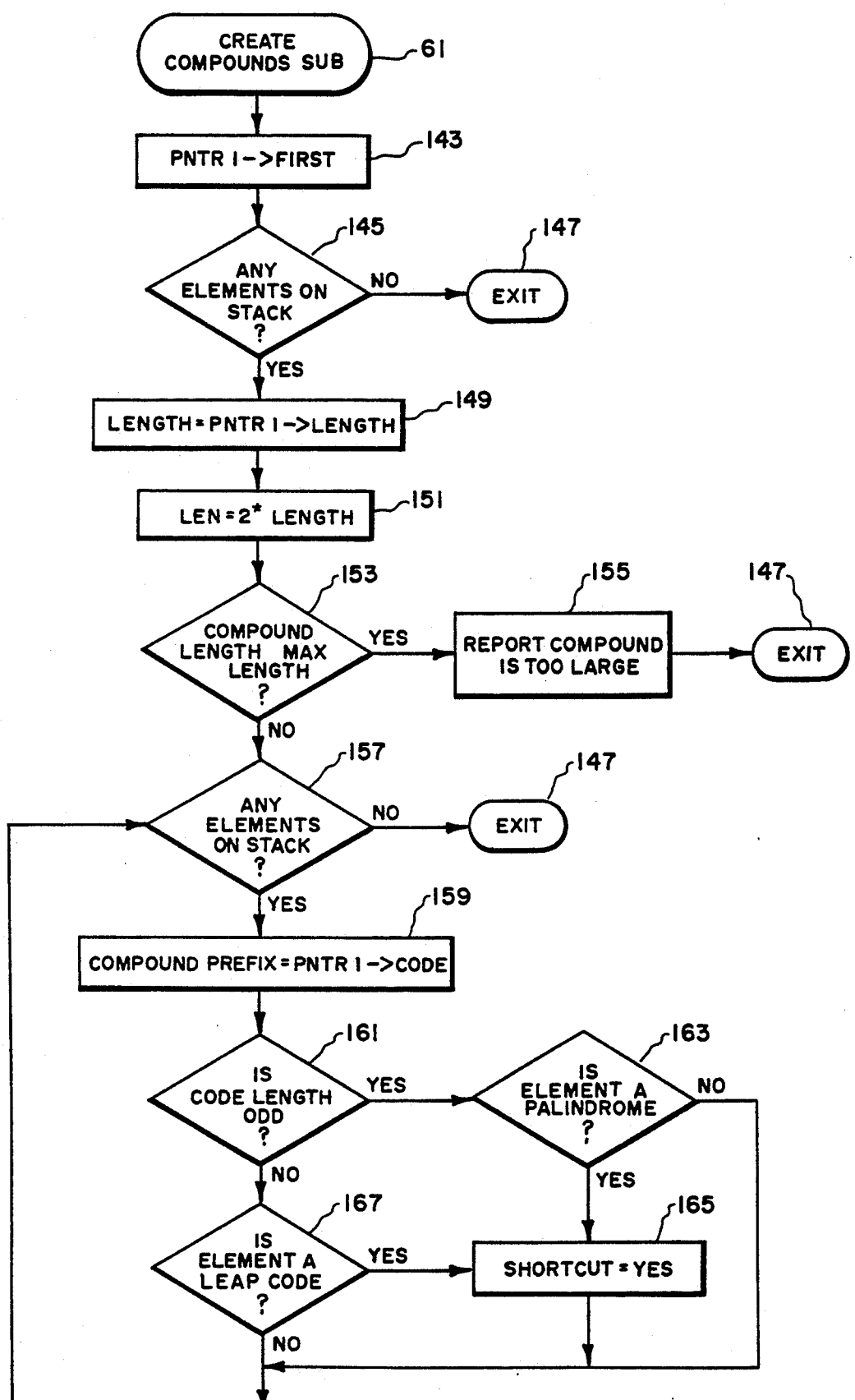

Referring to FIG. 3e the program of Appendix A first identifies pointer one (program step 143) which, for example, for a code of length three is 111 and is identified as A in TABLE IV. At this time, it should be noted that a code of length three will be used to illustrate the operation of the create compound subroutine of FIGS. 3e-3h.

The program of Appendix A then asks if there are any elements left on the stack (program step 145). For the code of length three, the answer is "yes", that is elements 111, 101 and 100. The length of the subpulse pointed to by A of TABLE IV is set at three (program step 149), and len (which is equivalent to the compound length) is set equal to twice the length of A (program step 151).

Program step 153 ask whether the compound length is greater than the maximum allowable length of 128 and if the answer is "yes" the program of Appendix will not process the code specified by the user.

During program step 157, the program of Appendix A again ask if there are any elements left on the stack. For the code of length three the elements 111, 101, 100 remain on the stack.

During program step 159, the compound prefix is set equal to pointer one which is first set at A equals 111 for the code of length three. Program step 161 if the code length is odd and if the answer is "yes", program step 163 ask whether the element being evaluated is a palindrome. Since the element 111 is a palindrome (that is the element 111 is equivalent to its inverse) the program of Appendix A proceeds to program step 165 which allows for a shortcut, that is the program of Appendix A first sets the evaluates the compound A A (111111) for correlation, but does not evaluate the compound A $A_I$ (111111).

At this time it should be noted that the leap code of program step 167 is defined as a doublet or mixed doublet of an even length code.

Program step 169 sets the compound suffix equal to the compound prefix so that the compound 100100 may be evaluated for correlation. The program of Appendix A next enters the evaluation subroutine of FIG. 3h (program step 171), incrementing the compound count (program step 227) followed the correlation of the compound using a correlate compound subroutine which is identical to the correlate element subroutine of FIG. 3d. When the compound is correlated (program step 229) the program of Appendix A increments the compound accept count (program step 233), prints the code (program step 237) and if the user answers the question "yes that the codes are to be expanded (program step 237) prints the sidelobes (program step 239) for view by the user.

The program of Appendix A exits the evaluate compound subroutine (program step 231) proceeding to program step 173 which sets the compound suffix equal to the complement of the compound prefix resulting in the compound 111000 be correlated by the program of Appendix A. Since the prefix is a palindrome, the program of Appendix A utilizes the shortcut procedure of program step 175 skipping program steps 177-185 and then proceeding to program step 187. This, in turn, eliminates the compounds A $A_I$ (111111); A $A_{IC}$ (111000); $A_I$ A (111111) and $A_I A_C$ (111000).

During program step 187 pointer two is set to 101 while pointer one remains 111. The compound suffix is then set equal to pointer two (program step 189) while the compound prefix is set equal to pointer one (program step 191) resulting in the compound 111101 being correlated by the program of Appendix A.

During program step 193 the compound prefix is set to the complement of pointer one which is 000 and the compound 000101 is correlated by the program of Appendix A. The program of Appendix A next uses the shortcut procedure of program step 195 and skips program steps 197 and 199. This results in the program of Appendix A not correlating the compounds $A_I$ B (111101) and $A_{IC}$ B (000101).

The program of Appendix A next proceeds to program step 201. Since pointer two which is now 101 is symmetric the program of Appendix A skips program steps 203-213. This results in the program of Appendix A not correlating the compounds A $B_I$ (111101); $A_I B_I$ (111101); $A_C B_I$ (000101) and $A_{IC} B_I$ (000101).

During program step 215 pointer two is set at 100, the program of Appendix A ask if there are more elements for pointer two (program step 217) and since the answer is "yes", the program of Appendix A evaluates the following compounds of length six for correlation processing with the prefix (pointer one) being 111 and the suffix (pointer two) being 100.

|  | Prefix | Suffix |
|---|---|---|
| A = 111, B = 100 |  |  |
| A B | 111 | 100 |
| A $B_I$ | 111 | 001 |
| $A_I$ B | 111 | 100 |
| $A_I B_I$ | 111 | 001 |
| $A_C$ B | 000 | 100 |
| $A_C B_I$ | 000 | 001 |
| $A_{IC}$ B | 000 | 100 |
| $A_{IC} B_I$ | 000 | 001 |

Figure 3F:
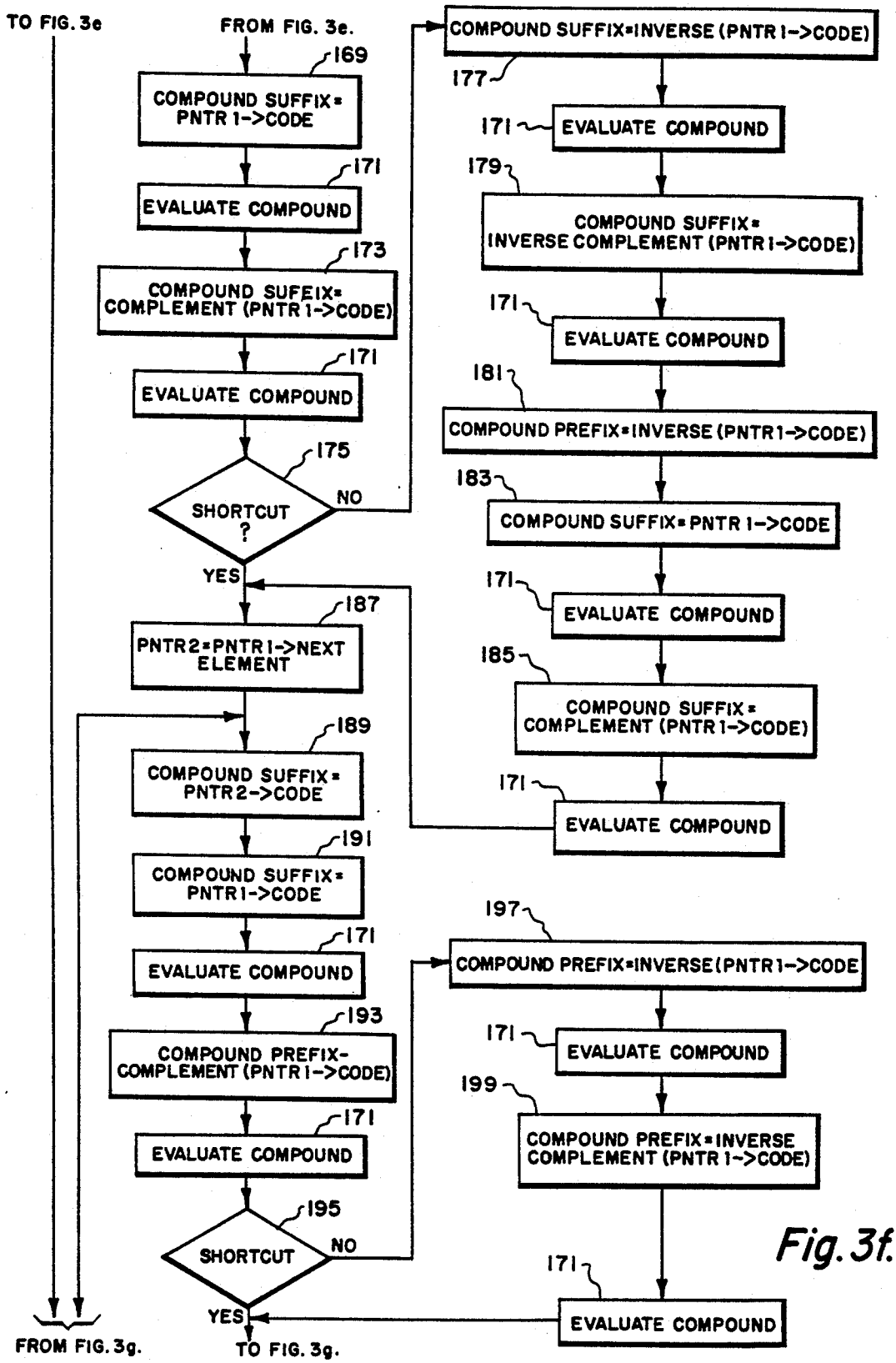
Figure 3G:
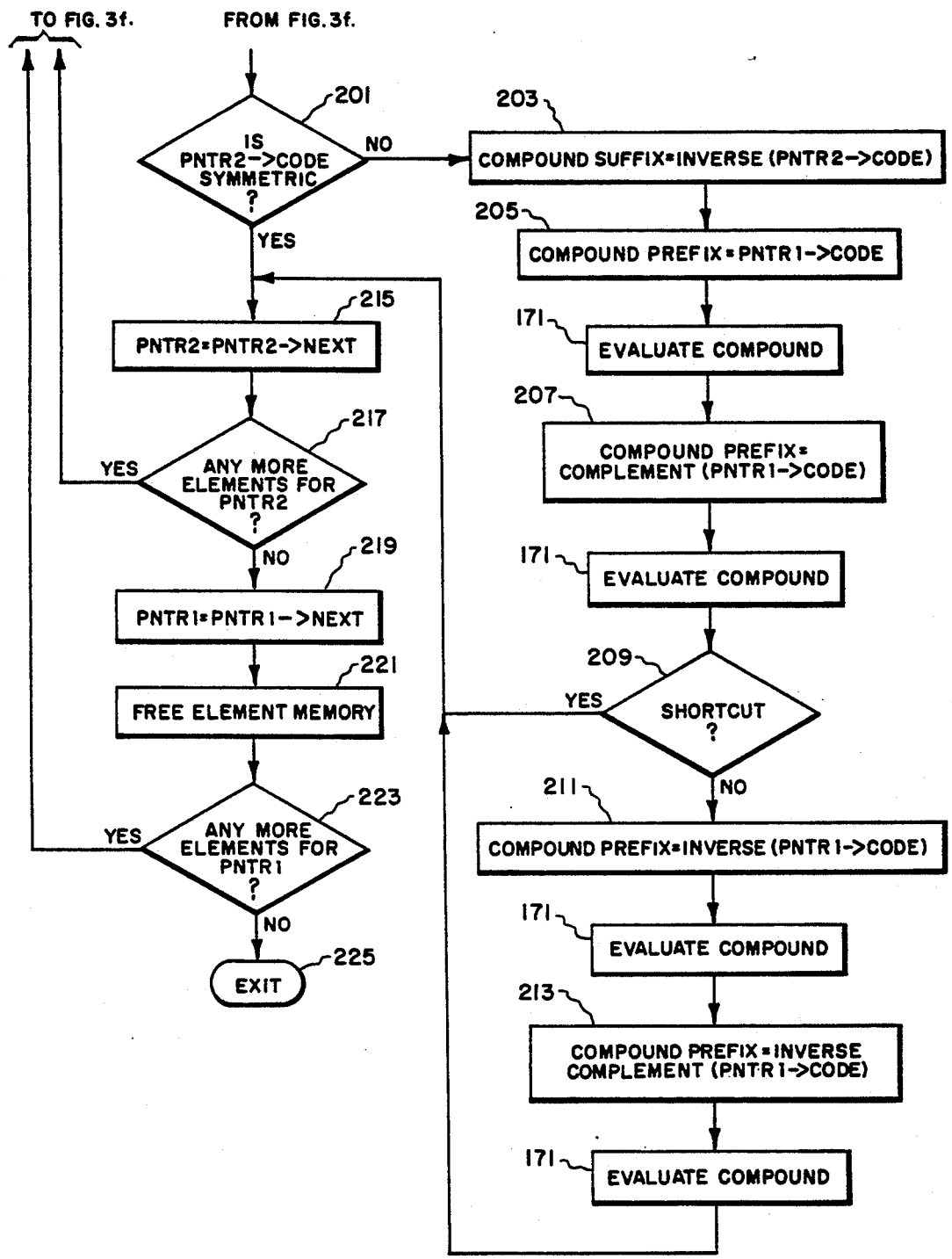

The program of Appendix A next uses the create compound subroutine of FIGS. 3e, 3f and 3g to eliminate the compounds $A_I$B (111100); $A_I B_I$(111001); $A_{IC}$ B (000100) and $A_{IC} B_I$ (000001) from correlation processing while correlating the compounds A B (111100); A $B_I$(111001); $A_C$ B (000001) and $A_C B_I$(000001) using the evaluate compound subroutine of FIG. 3h. This evaluation process for a compound of length six by the program of Appendix A continues with the last evaluation occurring when the prefix and suffix are set at 100. The program of Appendix A then evaluates each of the following compounds in accordance with the rules of TABLE IV for correlation.

|  | Prefix | Suffix |
|---|---|---|
| A = 100 |  |  |
| A A | 100 | 100 |
| A $A_I$ | 100 | 001 |
| A $A_C$ | 100 | 110 |
| A $A_{IC}$ | 100 | 011 |
| $A_I$ A | 001 | 100 |
| $A_I A_C$ | 001 | 011 |

The program of Appendix A then correlates each of these compounds where pointer one is 100.

The following example illustrates that which a user would observe on a monitor during an evaluation of codes of length three (compounds of length six) wherein the user specifies an Alpha of minus one, a beta of one and a Phased sidelobe threshold of six.

This program computes pulse compression codes for use with a modified correlation sequence of arbitrary coefficients (Alpha, Beta)

Alpha? −1
Beta? 1
Generate codes of what length? (<128) 3
Use phased sidelobe level as threshhold? (Y/N) Y
Phased sidelobe threshhold? 6

Restrict selection by sidelobe amplitude level? (Y/N)
N
Show all evaluated codes? (Y/N) N
Show usable codes? (Y/N) Y
Expand codes? (Y/N) Y

```
001       -1   0         3 [0]     [1]
101        1  -2         3 [1]     [2]
111        1   2         3 [2]     [2]
    0 --> 1       1 -->        2 --> 1
                       1
```

3 candidates for length 3. 3 judged acceptable.
Creating compounds . . .

```
111111    1   2   3    4   5   6 [5]  [5]
111000   -1  -2  -3    0   3   6 [3]  [3]
111101    1   0   1    2   1   6 [2]  [2]
000101   -1   0  -1    2  -1   6 [2]  [2]
111100   -1  -2  -1    0   3   6 [3]  [3]
000100    1   2   1    0   1   6 [2]  [2]
111001    1   0  -1   -2   1   6 [1]  [2]
000001   -1   0   1    2   3   6 [3]  [3]
101101    1  -2   3    0  -3   6 [3]  [3]
101010   -1   2  -3    4  -5   6 [4]  [5]
101100   -1   0   1   -2  -1   6 [1]  [2]
010100    1   0  -1    2  -3   6 [2]  [3]
101001    1  -2   1    0  -3   6 [1]  [3]
010001   -1   2  -1    0  -1   6 [2]  [2]
100100   -1   0   3   -2  -1   6 [3]  [3]
100011    1   0  -3   -2   1   6 [1]  [3]
100001    1  -2  -1    0   1   6 [1]  [2]
100110   -1   2   1   -4  -1   6 [2]  [4]
001100    1   2  -1   -4   1   6 [2]  [4]
001011   -1  -2   1    0  -1   6 [1]  [2]
```

20 candidates for length 6. 20 judged acceptable.

Program Ends

It should be noted that method of the present invention may be used in many applications such pulse compression radar systems to provide for maximum sidelobe suppression and digital communication systems to increase transmission range, noise rejection and the reliability of such systems. For example, it is possible to provide a mainlobe to sidelobe ratio of 4096:0 using the method of the present invention. The only practical limitation on system performance would be signal to noise ratio. Thus a pulse compression system utilizing the method of the present invention could obtain an improvement in signal to noise ratio of about 4096:1 (72.2 dB) over prior art signal pulse techniques and an improvement factor of about 292 (49.3 dB) over prior art pulse compression techniques.

While the present invention has been illustrated in accordance with the preferred embodiment, it is recognized that variations and changes may be made therein without departing from the invention as set forth in the claims.

Navy Case No. 75381

APPENDIX A

```
//
//    Modified Pulse compression simulator created for inclusion
//    with patent request.
//
//
//
// include <conio.h>
include <stdio.h>
#include <stdlib.h>
include <string.h> define MAX_LENGTH 128
define energy(parm)   (((parm) > 0) ? (parm) : -(parm))
#define toggle(parm) ((parm) ? 0 : 1);

const unsigned int max_length = MAX_LENGTH;

typedef struct pulse_code_st {
      unsigned int length;
      char pulse_code[MAX_LENGTH];
      struct pulse_code_st *next;
} PCODE;

PCODE *stack, *current;

long unsigned int element_accept = 0;
```

```c
long unsigned int compound_accept = 0;
int alpha;
int beta;
char code[MAX_LENGTH];
int index;
long unsigned int element_count = 0;
long unsigned int compound_count = 0;
char done = 0;
unsigned int len;
char morph_form;
char lobe[MAX_LENGTH];
long int lobe_count[MAX_LENGTH];
int peak_energy;
int peak_lobe;
int phase_threshhold;
int energy_threshhold;
int expand_codes;
int use_phase_threshhold;
int use_energy_threshhold;
int show_all_codes;
int show_usable_codes = 'Y';

int correlate(void);
int correlate_compounds(void);
void create_compounds(PCODE *);
void delete_item(PCODE *);
char eval(void);
void evaluate_compound(void);
void expnd(void);
int getyn(void);
char incr(void);
void init(void);
void insert_item(PCODE *);
char leap(void);
unsigned char leap_element(unsigned int);
char palindrome(void);
unsigned char palindrome_element(unsigned int);
void print_code(void);
void show_lobe_count(void);

main()
{
    clrscr();
    puts("\nThis program computes pulse compression codes");
    puts("for use with a modified correlation sequence");
    puts("of arbitrary coefficients (Alpha, Beta)");

printf("Alpha? ");
    scanf("%d", &alpha);

printf("Beta? ");
    scanf("%d", &beta);

printf("Generate codes of what length? (<%d) ", max_length);
    scanf("%d", &len);
    printf("\nUse phased sidelobe level as threshhold? (Y/N) ");
    use_phase_threshhold = getyn();
    if(use_phase_threshhold == 'Y')
    {
        printf("\nPhased sidelobe threshhold? ");
        scanf("%d", &phase_threshhold);
    }
    printf("\nRestrict selection by sidelobe amplitude level? (Y/N) ");
    use_energy_threshhold = getyn();
```

```
        if(use_energy_threshhold == 'Y')
        {
            printf("\nSidelobe amplitude threshhold? ");
            scanf("%d", &energy_threshhold);
        }
        printf("\nShow all evaluated codes? (Y/N) ");
        show_all_codes = getyn();

if(show_all_codes == 'N')
        {
            printf("\nShow usable codes? (Y/N) ");
            show_usable_codes = getyn();
        }
        if(show_usable_codes == 'Y')
        {
            printf("\nExpand codes? (Y/N) ");
            expand_codes = getyn();
        }
        printf("\n");

init();
        while(!done)
        {
```

/*
If the code is of odd length we first evaluate it for possible
use, then invoke palindrome logic if necessary.
*/

```
            eval();
            if(len & 1)
```

/*
If the code is a palindrome we jump to the next palindrome
by setting the middle bit.
*/

```
            {
                if (palindrome())
                {
                    code[(len-1) >> 1] = 1;
                    eval();
                }
            }
            else
            {
```

/*
When the length is even we must check to see if the code is a
leap code. If so we invoke leap logic.
*/

```
                if (leap())
                {
                    for(index = 0; index < (len >> 1); index++)
                        code[index] ^= 1;
                    eval();
                }
            }
            done = incr();
        }
        show_lobe_count();
        printf("\n\n%d candidates for length", element_count);
        printf(" %d.  ", len);
        printf("%d judged acceptable.\n", element_accept);
        printf("\nCreating compounds...\n");
        create_compounds(stack);
        if (wherex() > 1)
            printf("\n");
        printf("\n%d candidates for length", compound_count);
        printf(" %d.  ", len);
```

```
        printf("%d judged acceptable.\n", compound_accept);
        printf("\nProgram Ends");

} int correlate(void)
{
    register char i, j;
    int sidelobe, sidelobe_energy;
    peak_energy = 0;
    peak_lobe = 0;
    for(i = 1; i < len; i++)
    {
        sidelobe = 0;
        for(j = 0; j < i; j++)
            sidelobe += (code[j] == code[len-i+j] ? beta : alpha);
        lobe[i] = sidelobe;
        if (sidelobe > peak_lobe)
            peak_lobe = sidelobe;
        sidelobe_energy = energy(sidelobe);
        if (sidelobe_energy > peak_energy)
            peak_energy = sidelobe_energy;
    }
    return peak_energy;
} int correlate_compounds(void)
{
    char i, j;
    int sidelobe, sidelobe_energy;
    peak_energy = 0;
    peak_lobe = 0;
    for(i = 1; i < len; i++)
    {
        sidelobe = 0;
        for(j = 0; j < i; j++)
            sidelobe += (code[j] == code[len-i+j] ? beta : alpha);
        lobe[i] = sidelobe;
        if (sidelobe > peak_lobe)
            peak_lobe = sidelobe;
        sidelobe_energy = energy(sidelobe);
        if (sidelobe_energy > peak_energy)
            peak_energy = sidelobe_energy;
    }
    if(use_phase_threshhold == 'Y')
        if(peak_lobe > phase_threshhold) return 0;
    if(use_energy_threshhold == 'Y')
        if(peak_energy > energy_threshhold) return 0;

return 1;
} void create_compounds(PCODE *source)
{
    PCODE *pntr1, *pntr2;

/*  index - loop variable */
    register unsigned int index;

/*  length - length of one element */
    unsigned int length;

/*  shortcut - test to skip certain groups if A' = Ac */
    unsigned char shortcut;

/*  shortcut2 - test to skip certain groups if B = Bc */
    unsigned char shortcut2;
```

```
        pntr1 = source -> next;
        if (pntr1 == NULL)
        {
            printf("No elements left.");
            exit(EXIT_FAILURE);
        } length = pntr1 -> length;
        len = 2 * length;
        if (len > MAX_LENGTH)
        {
            printf("Compound size exceeds MAX LENGTH.");
            exit(EXIT_FAILURE);
        }
        while(pntr1 != NULL)
        {
/*      Generate A prefix */
            for (index = 0; index < length; index++)
                code[index] = pntr1 -> pulse_code[index];

/*      Perform shortcut test */
            shortcut = (length & 1 ? palindrome_element(length) :
leap_element(length));

/*      Generate case for AA */
            for (index = 0; index < length; index++)
                code[index + length] = pntr1 -> pulse_code[index];
            evaluate_compound();

/*      Generate case for AAc */
            for (index = 0; index < length; index++)
                code[index + length] = toggle(pntr1 -> pulse_code[index]);
            evaluate_compound();

if(!shortcut)
            {
/*      Generate case for AAi */
                for (index = 0; index < length; index++)
                    code[index + length] = pntr1 -> pulse_code[(length) -
1 - index];
                evaluate_compound();

/*      Generate case for AAic */
                for (index = 0; index < length; index++)
                    code[index + length] = toggle(pntr1 ->
pulse_code[(length) - 1 - index]);
                evaluate_compound();

/*      Generate Ai prefix */
                for (index = 0; index < length; index++)
                    code[index] = pntr1 -> pulse_code[length - 1 -
index];

/*      Generate case for AiA */
                for (index = 0; index < length; index++)
                    code[index + length] = pntr1 -> pulse_code[index];
                evaluate_compound();
/*      Generate case for AiAc */
                for (index = 0; index < length; index++)
                    code[index + length] = toggle(pntr1 ->
pulse_code[index]);
                evaluate_compound();
            }
            pntr2 = pntr1 -> next;

while(pntr2 != NULL)
```

```
        {
/*      Generate B suffix */
                for (index = 0; index < length; index++)
                        code[index + length] = pntr2 -> pulse_code[index];

/*      Generate case for AB */
                for (index = 0; index < length; index++)
                        code[index] = pntr1 -> pulse_code[index];
                evaluate_compound();

/*      Generate case for AcB */
                for (index = 0; index < length; index++)
                        code[index] = toggle(pntr1 -> pulse_code[index]);
                evaluate_compound();

if (!shortcut)
                {
/*      Generate case for AiB */
                        for (index = 0; index < length; index++)
                                code[index] = pntr1 -> pulse_code[length - 1 - index];
                        evaluate_compound();

/*      Generate case for AicB */
                        for (index = 0; index < length; index++)
                                code[index] = toggle(pntr1 -> pulse_code[length - 1 - index]);
                        evaluate_compound();
                } shortcut2 = 1;
                for (index = 0; index < (length >> 1); index++)
                        if ((pntr2 -> pulse_code[index]) != (pntr2 -> pulse_code[length - 1 - index]))
                        {
                                shortcut2 = 0;
                                break;
                        }
                if (!shortcut2)
                {
/*      Generate Bi suffix */
                        for (index = 0; index < length; index++)
                                code[index + length] = pntr2 -> pulse_code[length - 1 - index];

/*      Generate case for ABi */
                        for (index = 0; index < length; index++)
                                code[index] = pntr1 -> pulse_code[index];
                        evaluate_compound();

/*      Generate case for AcBi */
                        for (index = 0; index < length; index++)
                                code[index] = toggle(pntr1 -> pulse_code[index]);
                        evaluate_compound();

if (!shortcut)
                        {
/*      Generate case for AiBi */
                                for (index = 0; index < length; index++)
                                        code[index] = pntr1 -> pulse_code[length - 1 - index];
                                evaluate_compound();

/*      Generate case for AicBi */
                                for (index = 0; index < length; index++)
                                        code[index] = toggle(pntr1 ->
```

```
                pulse_code[length - 1 - index]);
                            evaluate_compound();
                    }
            } pntr2 = pntr2 -> next;
            }
            pntr1 = pntr1 -> next;
            delete_item(source);
        }
} void delete_item(PCODE *head)
{
    current = head -> next;
    head -> next = current -> next;
    free(current);
} char eval(void)
{
    element_count++;
    correlate();
    if(show_all_codes == 'Y')
    {
        print_code();
        if(expand_codes == 'Y')
            expnd();
    }
    if(use_phase_threshhold == 'Y')
        if(peak_lobe > phase_threshhold) return 0;
    if(use_energy_threshhold == 'Y')
        if(peak_energy > energy_threshhold) return 0;
    if(show_all_codes == 'N')
    {
        print_code();
        if(expand_codes == 'Y')
            expnd();
    }
    insert_item(stack);
    if(use_energy_threshhold == 'Y')
        lobe_count[peak_energy]++;
    else
        lobe_count[peak_lobe]++;
    element_accept++;
    return 1;
} void evaluate_compound(void)
{
    compound_count++;
    if(correlate_compounds())
    {
        compound_accept++;
        print_code();
        if(expand_codes == 'Y')
        {
            printf("\t");
            expnd();
        }
    }
} void expnd(void)
{
    register unsigned int i;
    for (i = 1; i < len; i++)
```

```c
                printf("  %3d", lobe[i]);
        printf("  %3d   [%d]   [%d]\n", (beta * len), peak_lobe, peak_energy);
        return;
} int getyn(void)
{
        char key;

while(1)
        {
                key = getch();
                switch(key) {
                case 'y':
                case 'Y':
                        printf("Y\n");
                        return 'Y';
                case 'n':
                case 'N':
                        printf("N\n");
                        return 'N';
                }
        }
} char incr(void)
{
        int index;
        index = 0;
        while(code[index] == 1)
                code[index++] = 0;
        if(index == len)
                return 1;
        code[index] = 1;
        return 0;
} void init(void)
{
        int index;
        for(index = 0; index < MAX_LENGTH; index++)
                code[index] = 0;
        code [len-1] = 1;

for(index = 0; index < MAX_LENGTH; index++)
                lobe_count[index] = 0;

stack = (PCODE *) malloc(sizeof (PCODE));
        if (stack == NULL)
        {
                puts("Sorry, out of memory.\n");
                exit(EXIT_FAILURE);
        }
        strcpy(stack -> pulse_code, "Head of stack.");
        stack -> length = 0;
        stack -> next = NULL;
        return;
} void insert_item(PCODE *head)
{
        current = (PCODE *) malloc(sizeof (PCODE));
        if (current == NULL)
        {
                puts("Sorry, out of memory.\n");
                exit(EXIT_FAILURE);
```

```
        }
        for (index = 0; index < len; index++)
                current -> pulse_code[len - index - 1] = code[index];
        current -> next = head -> next;
        current -> length = len;
        head -> next = current;
} char leap(void)
{
        char i, j, flag;
        i = 0;
        j = len - 1;
        flag = 1;

/*
        First we check to see if the code is an even palindrome.
*/ while(i < j)
                if(code[i++] != code[j--])
                {
                        flag = 0;
                        break;
                }
        if (flag)
                return flag;

/*
        Then we check to see if all the bits on one side were inverted,
        if it were be an even palindrome.
*/ i = 0;
        j = len - 1;
        flag = 1;
        while(i < j)
                if(code[i++] == code[j--])
                        return 0;
        return 1;
} unsigned char leap_element(unsigned int length)
{
        char i, j, flag;
        i = 0;
        j = length - 1;
        flag = 1;

/*
        First we check to see if the code is an even palindrome.
*/ while(i < j)
                if(code[i++] != code[j--])
                {
                        flag = 0;
                        break;
                }
        if (flag)
                return flag;

/*
        Then we check to see if all the bits on one side were inverted,
        if it were be an even palindrome.
*/
```

```
    i = 0;
    j = length - 1;
    flag = 1;
    while(i < j)
        if(code[i++] == code[j--])
            return 0;
    return 1;
} char palindrome(void)
{
    char i, j;
    i = 0;
    j = len - 1;
    while (i < j)
        if(code[i++] != code[j--]) return 0;
    return 1;
} unsigned char palindrome_element(unsigned int length)
{
    char i, j;
    i = 0;
    j = length - 1;
    while (i < j)
        if(code[i++] != code[j--]) return 0;
    return 1;
} void print_code(void)
{
    register char index;

if(show_usable_codes == 'Y')
    {
        if ((wherex() + len) > 80)
            printf("\n");
        for(index = 0; index < len; index++)
            putch(code[index] ? '1' : '0');
        if (wherex() < 70)
            printf("\t");
        else
            printf("\n");
    } return;
} void show_lobe_count(void)
{
    char index;
    char last_lobe = 0;
    for(index = len; index > 0; index--)
    {
        if(lobe_count[index] != 0)
        {
            last_lobe = index;
            break;
        }
    }
    if(index > 0)
        printf("\n");
    if(wherex() > 1)
        printf("\n");
```

```
for(index = 0; index <= last_lobe; index++)
    printf("%d --> %d  ", index, lobe_count[index]);
return;
}
```

What is claimed is:

1. A method for determining all binary codes of a predetermined length N for sidelobe suppression in a pulse compression radar system, said method comprising:

selecting said binary codes of length N for correlation, said binary codes having a length of at least three;

each of said binary codes of length N being one of four allomorphic forms, all allomorphic forms of one of said binary codes having the same correlation characteristics;

the allomorphic forms for each of said binary codes of length N consisting of said binary code, an inversion of said binary code, a complement of said binary code and an inverted complement of said binary code;

eliminating three of the four allomorphic forms of each binary code of length N so as to reduce the number of binary codes of length N for correlation;

selecting first and second arbitrary coefficients, said first arbitrary coefficient being an out of phase correlation element having a negative numerical value of at least minus one and said second arbitrary coefficient being an in phase correlation element having a positive numerical value of at least one;

correlating each of the remaining binary codes of length N after eliminating the allomorphic forms of each of said binary codes of length N, said first and second arbitrary coefficients effecting the correlation of each of the remaining binary codes of length N;

the remaining binary codes of length N after the allomorphic forms thereof are eliminated forming a sequential stack of binary elements of length N, said sequential stack of binary elements having at least three binary elements of length N;

creating at least first, second and third groupings of binary compounds of length 2N from a binary element A selected from said at least three binary elements of length N, said binary element A being a different one of said at least three binary elements for each of said at least first, second and third groupings of binary compounds;

said at least first, second and third groupings of binary compounds including a first binary compound A A, a second binary compound A $A_I$, a third binary compound A $A_C$, a fourth binary compound A $A_{IC}$, a fifth binary compound $A_I$ A and a sixth binary compound $A_I A_C$ wherein $A_I$ is an inversion of said binary element A, $A_C$ is a complement of said binary element A and $A_{IC}$ is an inverted complement of said binary element A;

creating at least fourth, fifth and sixth groupings of binary compounds of length 2N from said binary element A and another binary element B selected from said at least first, second and third binary elements of length N, said binary element A being a different one of said at least three binary elements for each of said at least fourth, fifth and sixth groupings of binary compounds;

said binary element B being a sequential binary element after said binary element A for each of said at least fourth, fifth and sixth groupings of compounds;

said at least fourth, fifth and sixth groupings of binary compounds including a seventh binary compound A B, an eighth compound A $B_I$, a ninth binary compound $A_I$ B, a tenth binary compound $A_I B_I$, an eleventh binary compound $A_C$ B, a twelfth binary compound $A_C B_I$, a thirteenth binary compound $A_{IC}$ B and a fourteenth binary compound $A_{IC} B_I$ wherein $B_I$ is an inversion of said binary element B;

evaluating each of said binary compounds of length 2N of said at least first, second, third, fourth, fifth and sixth groupings of binary compounds for correlation;

correlating at least said first binary compound A A and said third binary compound A $A_C$ from said at least first, second and third groupings of binary compounds;

correlating at least said seventh binary compound A B, and said eleventh binary compound $A_C$ B from said at least fourth, fifth and sixth groupings of binary compounds;

providing a visual image of the correlation of each binary code of length N and the correlation of each binary compound of length 2N from said at least first, second, third, fourth, fifth and sixth groupings of binary compounds.

2. The method of claim 1 wherein the length N of said binary codes selected for correlation is not greater than one hundred twenty eight.

3. The method of claim 1 wherein said second binary compound A $A_I$, said fourth binary compound A $A_{IC}$, said fifth binary compound $A_I$ A and said sixth binary compound $A_I A_C$ of said at least first, second and third groupings of binary compounds and said eighth binary compound A $B_I$ binary compound and said thirteenth binary compound $A_{IC}$ B of said at least fourth, fifth and sixth groupings of binary compounds are not evaluated for correlation whenever said binary element A is a palindrome.

4. The method of claim 1 wherein said second binary compound A $A_I$, said fourth binary compound A $A_{IC}$, said fifth binary compound $A_I$ A and said sixth binary compound $A_I A_C$ of said at least first, second and third groupings of binary compounds and said eighth binary compound A $B_I$ binary compound and said thirteenth binary compound $A_{IC}$ B of said at least fourth, fifth and sixth groupings of binary compounds are not evaluated for correlation whenever said binary element A is a doublet.

5. The method of claim 1 wherein said second binary compound A $A_I$, said fourth binary compound A $A_{IC}$, said fifth binary compound $A_I$ A and said sixth binary compound $A_I A_C$ of said at least first, second and third groupings of binary compounds and said eighth binary compound A $B_I$ binary compound and said thirteenth binary compound $A_{IC}$ B of said at least fourth, fifth and sixth groupings of binary compounds are not evaluated for correlation whenever said binary element A is a mixed doublet.

6. The method of claim 1 wherein said eighth compound $A B_I$ and said twelfth binary compound $A_C B_I$ of said at least, fourth, fifth and sixth groupings of binary compounds are not evaluated for correlation whenever said binary element B is symmetric.

7. The method of claim 1 wherein said tenth binary compound $A_I B_I$ and said fourteenth binary compound $A_{IC} B_I$ of said at least, fourth, fifth and sixth groupings of binary compounds are not evaluated for correlation whenever said binary element A is a palindrome.

8. The method of claim 1 wherein said tenth binary compound $A_I B_I$ and said fourteenth binary compound $A_{IC} B_I$ of said at least fourth, fifth and sixth groupings of binary compounds are not evaluated for correlation whenever said binary element A is a doublet.

9. The method of claim 1 wherein said tenth binary compound $A_I B_I$ and said fourteenth binary compound $A_{IC} B_I$ of said at least fourth, fifth and sixth groupings of binary compounds are not evaluated for correlation whenever said binary element A is a mixed doublet.

* * * * *